UNITED STATES PATENT OFFICE.

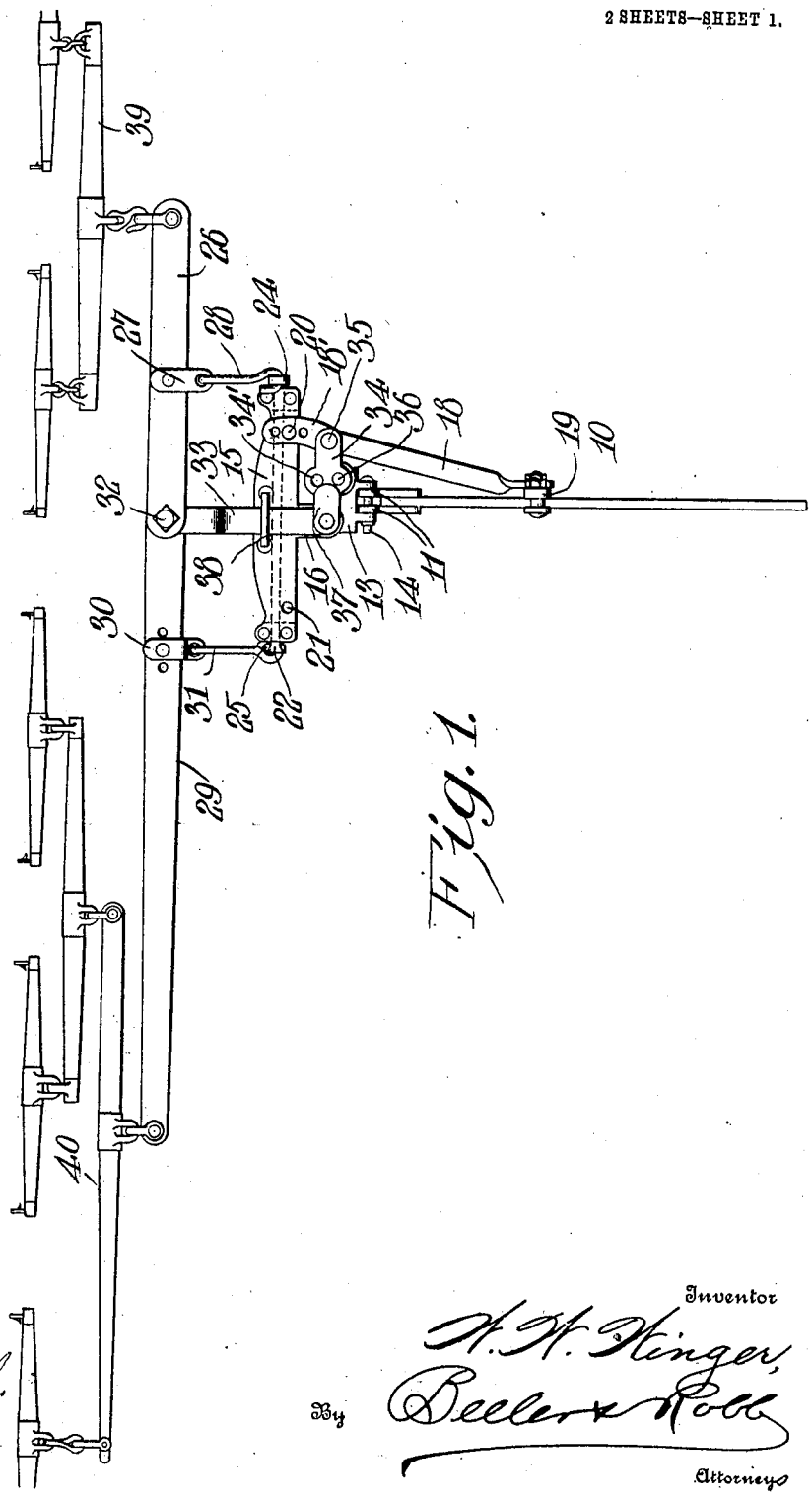

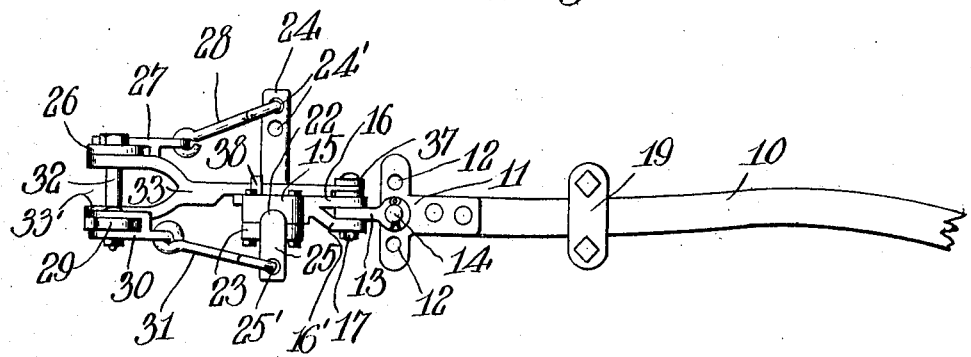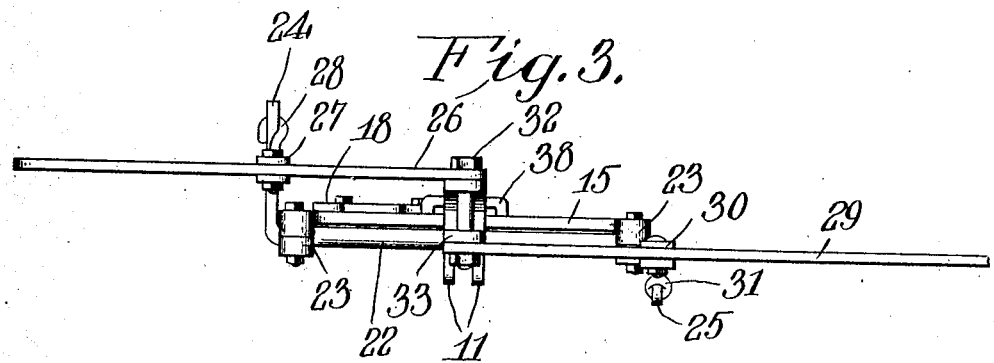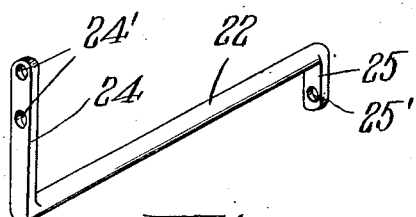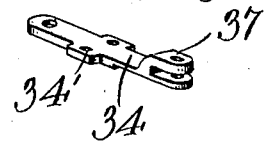

WILLIAM W. WINGER, OF WOLCOTT, INDIANA.

DRAFT-EQUALIZER.

No. 918,630.   Specification of Letters Patent.   Patented April 20, 1909.

Application filed May 25, 1908. Serial No. 434,849.

*To all whom it may concern:*

Be it known that I, WILLIAM W. WINGER, a citizen of the United States, residing at Wolcott, in the county of White and State of Indiana, have invented certain new and useful Improvements in Draft - Equalizers, of which the following is a specification.

This invention relates to draft equalizers designed for the purpose of accommodating a large number of draft animals. These devices are used very largely for agricultural purposes, such as in plowing, cultivating, and the like. In hitching as many as four or five horses to a plow, the difficulty has always been to so arrange them that the horses on the furrow side will not be obliged to walk upon the plowed land. In other words in order to apply the draft to the plow in the direction in which it should go in accordance with the construction of the plow, it has been found difficult to keep the draft in a line near enough to the furrow to accommodate the large number of horses which will be put on the land side.

By the use of this invention I am enabled to hitch as many as five horses, and keep them properly and conveniently arranged with respect to the furrow and land, and I keep the line of draft within proper limits with respect to the plow beam.

For a full understanding of the invention, including its construction and characteristic advantages, reference is to be had to the following detail description and the accompanying drawings, in which—

Figure 1 is a plan view of the invention showing the same as applied in use; Fig. 2 is a partial side elevation of the mechanism shown in Fig. 1; Fig. 3 is a front elevation of the mechanism shown in Fig. 2; Fig. 4 is a detail perspective of the rock shaft, and Fig. 5 is a like view of the spacing plate.

Throughout the following detail description and on the several figures of the drawings, similar parts are referred to by like reference characters.

At 10 is indicated any conventional form of plow beam or other implement or machine to which the horses are to be hitched. At the front end of the beam 10 is secured the usual head 11, having a vertical series of adjustment holes 12. Suitably positioned in said head, in one of such holes, corresponding to the depth at which it is desired to plow, is a coupling block 13, adjustably connected to the aforesaid head by a removable bolt 14. Located in front of the coupling block 13 is a cross head 15, extending transversely and substantially in the same horizontal plane as the coupling block. The cross head is provided with an arm 16 extending rearwardly to and secured upon the upper face of the block 13 by means of a bolt 17, and a complemental arm 16' is secured to the under side of said cross head, and which extends rearwardly embracing the lower surface of the block 13 and secured thereto by the said bolt 17. The main draft is brought upon the cross head, and the line of draft will therefore be through or in the direction of the arm 16, such draft being applied to the coupling block through the bolt 17, which it will be observed is only slightly to one side of the axis of the beam 10. In order to prevent lateral displacement or distortion of the cross head with respect to the beam, I employ a brace 18 secured at one end by means of a clamp 19 of any suitable construction to the plow beam. Associated with the front end of the brace 18 is a link 18' provided with a series of holes through any one of which connection may be made by means of a bolt 20 with the end of the cross head, a hole 21 being provided in the cross head at each end for this purpose. Thus far described and as illustrated the equalizer is adapted for connection with a right handed plow. It is to be understood, however, that one of the chief advantages of this equalizer is that it is adapted for use with a left handed plow as well. To this end the brace 18 would be attached to the opposite end of the cross head and clamped upon the opposite side of the beam 10. The arm 16 through its bolt 17 would be transferred to the opposite end of the coupling block.

A rock shaft 22 is associated with the cross head 15, suitably journaled parallel therewith. As indicated herein said rock shaft is journaled by the use of detachable bearings 23 upon the under surface of the cross head. Said rock shaft at the furrow end is provided with a long arm 24, projecting preferably upward, and at the opposite end the rock shaft is provided with a short arm 25 extending from the rock shaft in an opposite direction from that in which the longer arm 24 extends. The short arm 25 will be provided near its outer end with a hole 25', and the arm 24 will have a plurality of holes 24' at various distances from the axis of the rock shaft. On the furrow side there will be provided a lever 26 having a clevis 27 whereby detachable connection is made through a hook 28 with any selected hole 24' of the arm 24. On the land side there will be provided a lever 29, preferably longer than the lever 26, having a clevis 30, whereby detachable connection is made through a hook 31 with the hole 25'. The inner or adjacent ends of the levers 26 and 29 are secured by a bolt 32 to the front end of a fulcrum bar 33 extending rearwardly therefrom and secured at its rear end to the end of a spacing plate 34. The spacing plate is connected at the opposite end by means of a bolt 35 to the aforesaid brace 18 and link 18', the bolt 35 serving to connect the brace 18 and link to the furrow side or end of the spacing plate. Said plate 34 has a plurality of holes 34' intermediate of its ends, one in front of the other, whereby through one of such holes a bolt 36 secures the same to the coupling block 13. The plate 34 thereby rigidly braces the brace 18 laterally with respect to the plow beam. The connection between the rear end of the fulcrum bar 33 and the spacing plate 34 is further strengthened by the use of a coupling plate 37 connected to said bar at one end and to the spacing plate at the other, such connections being substantially permanent. Upon changing the arrangement from the position shown to that adapted for a left handed plow the connection between the spacing plate and the coupling block would be made by introducing the bolt 36 through the now vacant hole 34' and through the hole of the block 13 upon the left side as viewed in Fig. 1. In making such change the spacing plate 34 would be given a movement through an angle of one hundred and eighty degrees to the left, the fulcrum bar 33 remaining the same. The fulcrum bar 33 has loose guided connection with the cross head by means of a keeper 38, whereby the said bar will be permitted slight lateral movement with respect to the cross head, as would be occasioned by one team pulling slightly ahead of the other.

The furrow end of the lever 26 will be provided with a doubletree 39 of usual construction. When five horses are to be used, the opposite end of the lever 29 will have attached thereto a suitable form of three-horse evener 40. The levers 26 and 29 will occupy parallel horizontal planes, and for this purpose the fulcrum bar 33 is provided with a bifurcation 33' at its forward end, spacing the lever 26 vertically from the lever 29. This arrangement is necessitated by the fact that the connection between the lever 26 and the rock-shaft occupies a higher plane than that between the lever 29 and the rock shaft.

It will be understood that the relative lengths of the arms 24 and 25 will be such as to compensate for the difference in length of the levers 26 and 29, taking into account of course the number of horses to be hitched to each of said levers. The lever 26 being shorter than the lever 29, the arm 24 will be correspondingly longer than the arm 25. When two horses are hitched to the lever 26 and three horses to the lever 29, the hook 28 will be attached in the hole 24' farthest from the axis of the rock shaft, and when only two horses are used on the lever 29, the hook 28 will be moved inwardly toward the axis of the rock shaft, sufficiently far to equalize the draft for the several teams.

The several parts comprising this invention may be made of any suitable materials, either of metal or wood, and the relative sizes and proportions of the same may be varied as may be necessitated or desired by the user.

Slight modifications in details of construction may be made also without departing from the spirit of the invention hereinafter claimed.

Having thus described the invention, what is claimed as new, is:

1. In a device of the character set forth, the combination with a beam and its head, of a coupling block connected to the head, a cross head connected to one end of the coupling block, a spacing plate connected to the other end of the coupling block, a brace extending between the spacing plate and the beam, a rock shaft journaled to the cross head and having arms extending therefrom in opposite directions, draft means connected to the several arms of the rock shaft, and means extending from said draft means rearwardly to and connected to said spacing plate.

2. In a device of the character set forth, the combination with a beam and its head, of a coupling block connected to the head, a cross head connected to one end of the coupling block, a spacing plate connected to the other end of the coupling block, a brace extending between the spacing plate and the beam, a rock shaft journaled to the cross head and having arms extending therefrom in opposite directions, a fulcrum bar connected to the end of the spacing plate opposite the connection with the brace, and draft levers pivotally secured to the front end of the said fulcrum bar, said levers being connected to the several arms of the rock shaft.

3. In a draft equalizer, the combination with a beam and its head, of a coupling block attached to said head, a cross head secured to one end of the coupling block, a rock shaft journaled to the cross head and having arms of different lengths extending in opposite directions therefrom, a spacing plate secured to said coupling block, a brace extending from the spacing plate to the beam, a link extending from the braced end of the spacing plate to the cross head, said link having a plurality of holes, and draft means secured to the said rock shaft arms, substantially as set forth.

4. In a draft equalizer of the character set forth, the combination of a cross head, a rock shaft journaled thereto, said rock shaft having a longer and a shorter arm extending therefrom in opposite directions, a fulcrum bar pivoted to the cross head, draft levers pivoted at their adjacent ends to the fulcrum bar, said levers being detachably secured to the aforesaid rock shaft arms, and means to support the rear end of the fulcrum bar and said cross head, substantially as set forth.

5. The combination with a plow beam and head, of a reversible draft equalizer comprising a coupling block having a hole at each end, a cross head secured in one of said holes, the cross head having a hole near each end, a brace connected to the beam, a spacing plate connected to said block and to said brace, a link extending from the end of the spacing plate and brace and connected in one of said cross head holes, and draft means connected to said cross head, substantially as set forth.

In testimony whereof I affix my signature in presence of two witnesses.

WILLIAM W. WINGER.

Witnesses:
EDWARD BLUME,
FRANK NELSON.